(12) United States Patent
O'Connell et al.

(10) Patent No.: US 12,352,958 B2
(45) Date of Patent: *Jul. 8, 2025

(54) CURVED VIRTUAL IMAGE FOR HEADS UP DISPLAY

(71) Applicant: Panasonic Automotive Systems Company of America, Division of Panasonic Corporation of North America, Peachtree City, GA (US)

(72) Inventors: Patrick O'Connell, Novi, MI (US); Edo Omanovic, Livonia, MI (US)

(73) Assignee: Panasonic Automotive Systems Company of America, Division of Panasonic Corporation of North America, Peachtree City, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/435,397

(22) Filed: Feb. 7, 2024

(65) Prior Publication Data

US 2024/0241371 A1    Jul. 18, 2024

Related U.S. Application Data

(63) Continuation of application No. 17/746,334, filed on May 17, 2022, now Pat. No. 11,927,750, which is a continuation of application No. 17/027,930, filed on Sep. 22, 2020, now Pat. No. 11,360,302.

(60) Provisional application No. 62/915,777, filed on Oct. 16, 2019.

(51) Int. Cl.
*G02B 27/01*    (2006.01)
*B60K 35/00*    (2024.01)
*G02B 5/10*    (2006.01)
*B60K 35/23*    (2024.01)

(52) U.S. Cl.
CPC .......... *G02B 27/0101* (2013.01); *B60K 35/00* (2013.01); *G02B 5/10* (2013.01); *B60K 35/23* (2024.01)

(58) Field of Classification Search
CPC .......... G02B 27/0101; G02B 2027/011; B60K 35/00; B60K 2370/1529
See application file for complete search history.

(56) References Cited

U.S. PATENT DOCUMENTS

| | | | |
|---|---|---|---|
| 11,360,302 B2 * | 6/2022 | O'Connell | B60K 35/00 |
| 11,927,750 B2 * | 3/2024 | O'Connell | G02B 5/10 |
| 2013/0021224 A1 * | 1/2013 | Fujikawa | G02B 27/0101 345/7 |

* cited by examiner

*Primary Examiner* — Ryan D Howard
(74) *Attorney, Agent, or Firm* — Laurence S. Roach, Esq.

(57) ABSTRACT

A head up display arrangement for a motor vehicle includes an image source emitting a light field. A first freeform mirror is positioned to provide a first reflection of the light field. A generally concave second freeform mirror is positioned to receive the first reflection and provide a second reflection of the light field. The second reflection is reflected off of a windshield of the vehicle so as to be visible to a driver of the vehicle as a virtual image. The generally concave second freeform mirror includes a reflective surface having a shape such that the virtual image appears to be curved to the driver of the vehicle.

20 Claims, 4 Drawing Sheets

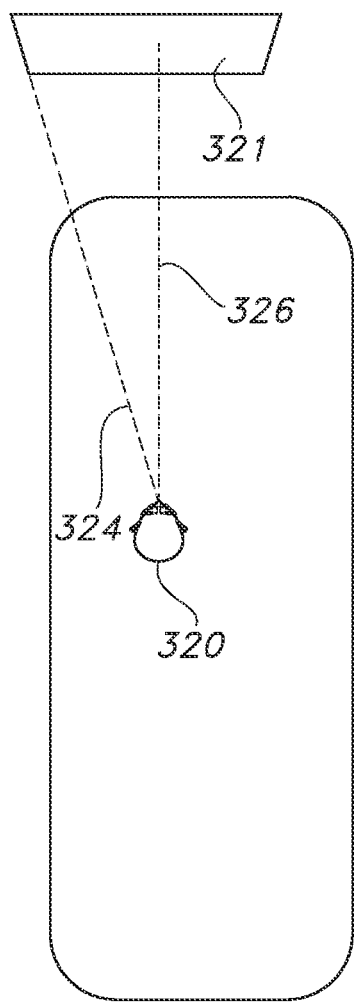 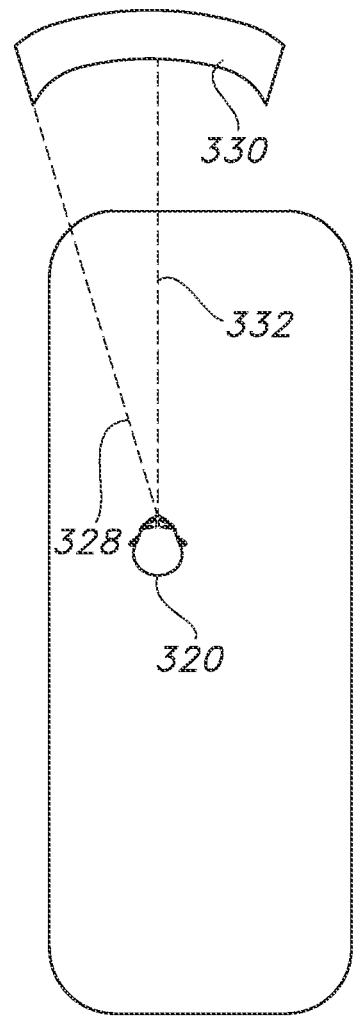
FIG. 3A
(PRIOR ART)
FIG. 3B

CURVED VIRTUAL IMAGE FOR HEADS UP DISPLAY

CROSS-REFERENCED TO RELATED APPLICATIONS

This application is a continuation of U.S. patent application Ser. No. 17/746,334, filed on May 17, 2022, which is currently under allowance, which claims benefit of U.S. patent application Ser. No. 17/027,930, filed on Sep. 22, 2020, Now U.S. Pat. No. 11,360,302, Issued on Jun. 14, 2022, which claims benefit of U.S. Provisional Application No. 62/915,777, filed on Oct. 16, 2019, the disclosures of which are hereby incorporated by reference in their entireties for all purposes.

FIELD OF THE INVENTION

The disclosure relates to a head up display (HUD) system in a motor vehicle.

BACKGROUND OF THE INVENTION

A head up display emits light that reflects off of one or more mirrors and from the front windshield to be seen by the driver. The light appears to come from a virtual image in front of the driver and in front of the windshield. This type of head up display is currently commercially available.

Conventional head up displays create the virtual image by first using a display to create an image. Next, the light from the image is reflected from one or more mirrors. Next, the light from the mirrors is reflected from the windshield. The mirrors are designed and positioned relative to the display so that the light seen by the driver, which is reflected from the windshield, appears to come from a virtual image that is outside of the vehicle. The mirrors and display are typically contained in a package that occupies a volume beneath the top surface of the dashboard.

Current HUDs have a flat virtual image plane relative to the driver. For small images, the flat virtual image plane works well. However, for larger images, the flat virtual image plane does not produce a HUD image that is pleasing to the driver and that coordinates well with the surrounding environment.

SUMMARY

The present invention may provide a curved virtual image produced by a head up display. The curvature of the virtual image may be a product of designing the aspheric mirror of the HUD correctly with the windshield/combiner to give the curved appearance.

In one embodiment, the invention comprises a head up display arrangement for a motor vehicle, including an image source emitting a light field. A first freeform mirror is positioned to provide a first reflection of the light field. A generally concave second freeform mirror is positioned to receive the first reflection and provide a second reflection of the light field. The second reflection is reflected off of a windshield of the vehicle so as to be visible to a driver of the vehicle as a virtual image. The generally concave second freeform mirror includes a reflective surface having a shape such that the virtual image appears to be curved to the driver of the vehicle.

In another embodiment, the invention comprises a head up display method for a motor vehicle including emitting a light field. A first freeform mirror is positioned to provide a first reflection of the light field. A generally concave second freeform mirror is positioned to receive the first reflection and produce a second reflection of the light field. The second reflection is reflected off of a windshield of the vehicle so as to be visible to a driver of the vehicle as a virtual image. A reflective surface of the generally concave second freeform mirror receives the first reflection and produces the second reflection. The reflective surface has a shape such that the virtual image appears to be curved to the driver of the vehicle.

In yet another embodiment, the invention comprises a head up display arrangement for a motor vehicle, including an image source emitting a light field. A first freeform mirror is positioned to provide a first reflection of the light field. A generally concave second freeform mirror has a reflective surface positioned to receive the first reflection and provide a second reflection of the light field. A windshield is positioned to receive the second reflection and provide a third reflection of the light field. The third reflection is visible to a driver of the vehicle as a virtual image disposed outside of the windshield. The reflective surface of the generally concave second freeform mirror has a shape such that the virtual image appears to be curved to the driver of the vehicle.

An advantage of the present invention is that the curved virtual image may be more optically pleasing to the viewer. The curvature may give the viewer the perception that all of the image is same distance away from the eye point. This takes advantage of our curved eyes' peripheral vision. Especially for larger virtual images, the curvature may be much more pleasing to the driver and more natural with the surrounding environment. The invention may provide the larger virtual image with a better alignment with the surrounding environment and a more natural feel for the driver's view. This reduces the need for the driver to refocus while looking at different parts of the virtual image.

BRIEF DESCRIPTION OF THE DRAWINGS

A better understanding of the present invention will be had upon reference to the following description in conjunction with the accompanying drawings.

FIG. 3A is a plan, schematic view of a vehicle of the prior art including a HUD producing a virtual image.

FIG. 3B is a plan, schematic view of a vehicle including one embodiment of a HUD of the present invention producing a virtual image.

DETAILED DESCRIPTION OF THE PREFERRED EMBODIMENTS

Figure 1:
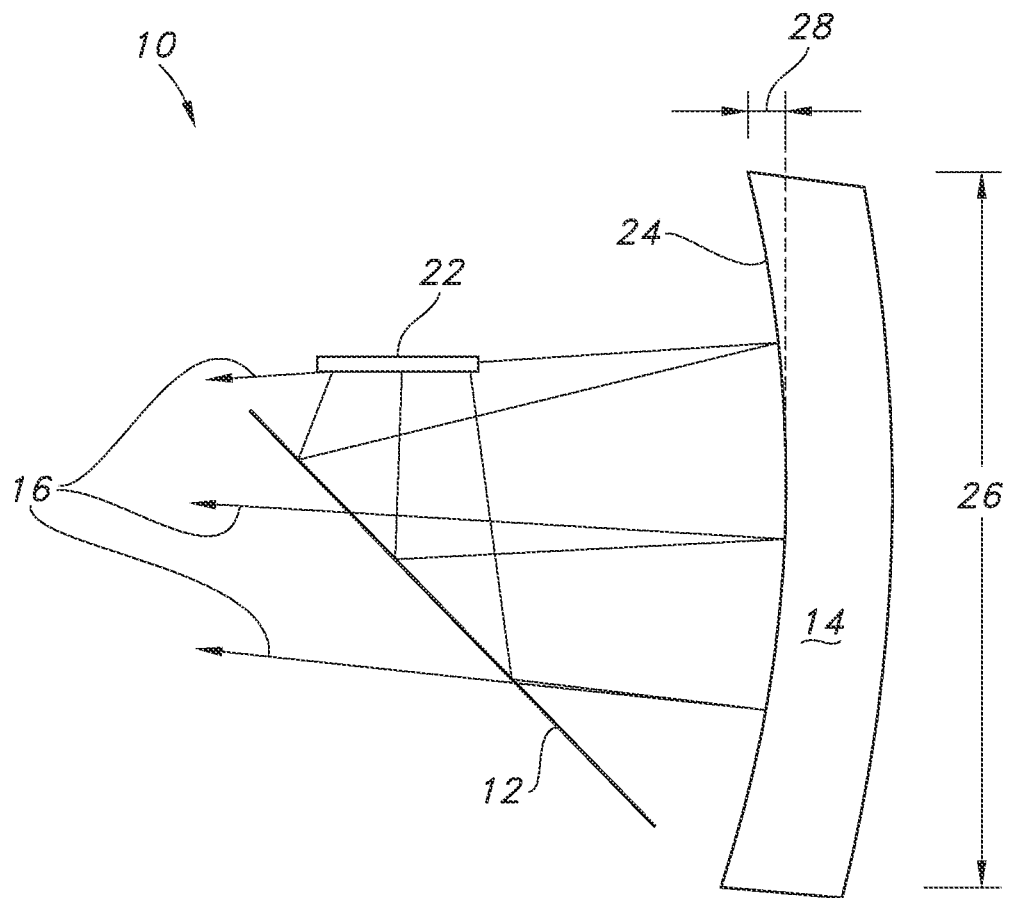
FIG. 1 is a schematic bottom view of one example embodiment of a HUD optical arrangement of the present invention.
Figure 2:
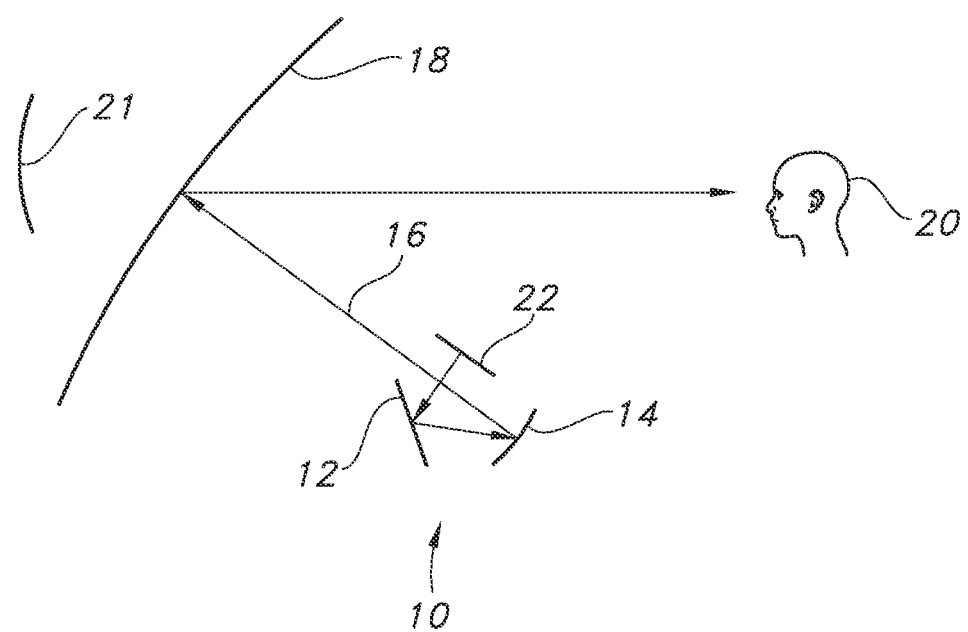
FIG. 2 is a schematic diagram of one example embodiment of a HUD system including the HUD optical arrangement of FIG. 1.

FIG. 1 illustrates one embodiment of a HUD optical arrangement 10 of the present invention, including two reflective freeform mirrors 12 and 14. Mirror 14 is aspheric, concave, and is arranged to aim rays 16 to reflect from a windshield 18, as shown in FIG. 2, to be seen by a human driver 20 as a curved virtual image 21. Rays 16 begin at diffuser 22, reflect from mirror 12, pass from mirror 14 to windshield 18, and reflect from windshield 18 to be seen by the driver. Mirror 12 is approximately flat and is oriented to reflect light rays or a light field from a display, or from an image presented on a diffuser 22, to mirror 14. To simplify FIG. 2, diffuser 22 and the ray from diffuser 22 to mirror 12 have been rotated about the ray from mirror 12 to mirror 14 so as to be in the same plane as the other objects shown in FIG. 2.

The concave curvature of the surface of mirror 14 may be modeled and/or designed with an extended polynomial description in a Zemax optical design software program such that virtual image 21 appears to be concavely curved. For example, virtual image 21 does not appear to be flat, but rather the lateral edges of virtual image 21 may appear to be closer to driver 20 than the lateral edges of a flat virtual would appear to be. Other aspherical mirror types within Zemax that could be used to model and/or design mirror 14 include a Chebyshev polynomial description, a Zernike polynomial description, and a biconic Zernike description. Another optical design software program that may be used to model and/or design mirror 14 is Code V. Another possibility is to design the reflective surface of mirror 14 by use of CAD software such as Catia or NX.

In one embodiment, mirror 14 has a reflective surface 24 having a height 26 (FIG. 1) of approximately between 250 mm and 300 mm. Reflective surface 24 may have a width in a direction into the page of FIG. 1 of approximately between 150 mm and 200 mm. Reflective surface 24 may have a depth 28 of approximately 2 mm.

Each point in virtual image 21 may appear to driver 20 to be at a point in space where light reflected from various points on mirror 14 cross, converge, or focus. The geometry of the reflective surface of mirror 14 may determine where in space the reflected light crosses, converges, or focusses.

Each of mirrors 12 and 14 may be a freeform mirror. The term "freeform" may mean that the mirror is not flat, conical, or frusto-conical, wherein cylindrical is considered to be a special case of conical. Mirror 14 may be generally concave, but mirror 12 may be neither generally concave nor generally convex. Mirror 12 may be approximately flat, but is designed to direct the rays appropriately.

FIG. 3A is a plan, schematic view of a vehicle of the prior art including a HUD producing a flat virtual image. A distance 324 from driver 320 to a lateral edge of virtual image 321 is greater than a distance 326 from driver 320 to a middle of virtual image 321.

FIG. 3B is a plan, schematic view of a vehicle including one embodiment of a HUD of the present invention producing a curved virtual image. A distance 328 from driver 320 to a lateral edge of virtual image 330 is approximately equal to a distance 332 from driver 320 to a middle of virtual image 330.

Figure 4:
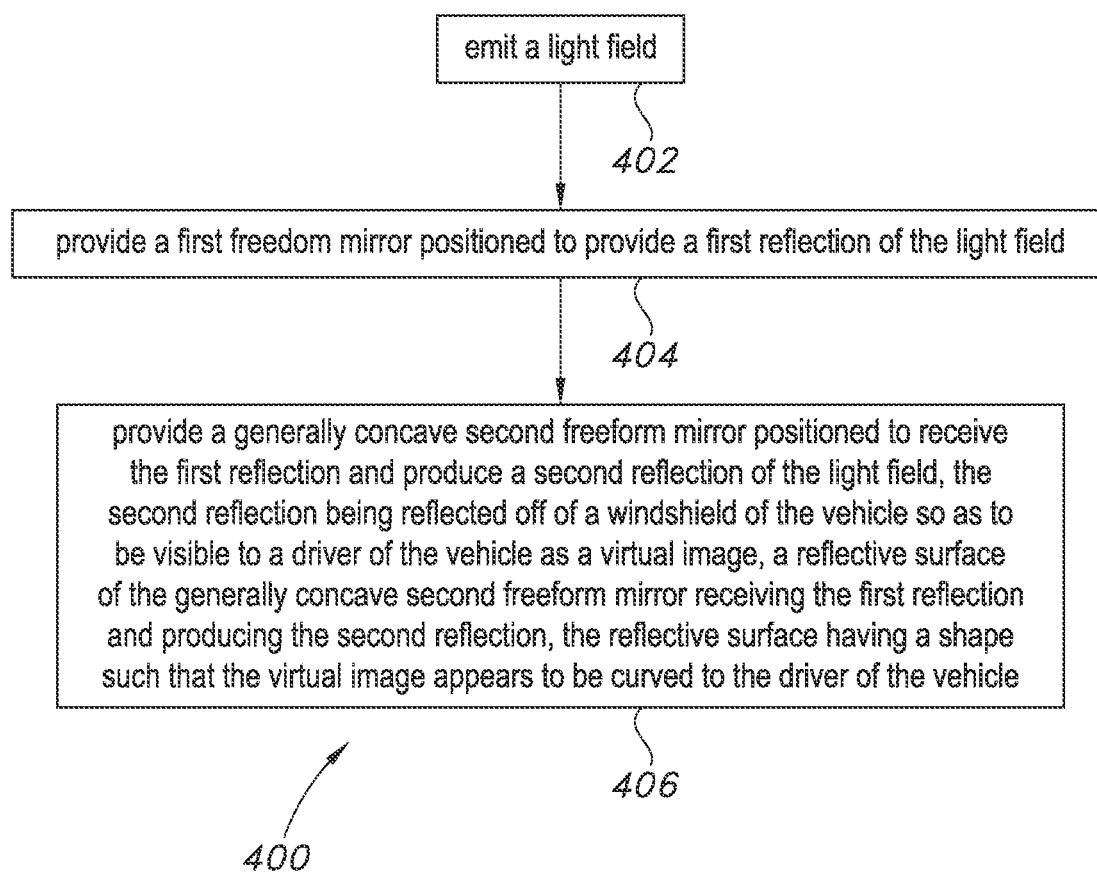
FIG. 4 is a flow chart of one embodiment of a head up display method of the present invention for a motor vehicle.

FIG. 4 illustrates one embodiment of a head up display method 400 of the present invention for a motor vehicle. In a first step 402, a light field is emitted. For example, diffuser 22 may emit a light field in the form of rays 16.

Next, in step 404, a first freeform mirror is positioned to provide a first reflection of the light field. For example, rays 16 reflect from mirror 12.

In a final step 406, a generally concave second freeform mirror is positioned to receive the first reflection and produce a second reflection of the light field. The second reflection is reflected off of a windshield of the vehicle so as to be visible to a driver of the vehicle as a virtual image. A reflective surface of the generally concave second freeform mirror receives the first reflection and produces the second reflection. The reflective surface has a shape such that the virtual image appears to be curved to the driver of the vehicle. For example, a generally concave second freeform mirror 14 is positioned to receive the first reflection of ray 16 from mirror 12 and produce a second reflection of ray 16. The second reflection of ray 16 is reflected off of windshield 18 of the vehicle so as to be visible to driver 20 of the vehicle as virtual image 21. A reflective surface 24 of generally concave second freeform mirror 14 receives the first reflection of ray 16 and produces the second reflection. Reflective surface 24 has a shape such that virtual image 21 appears to be curved to driver 20 of the vehicle.

The foregoing description may refer to "motor vehicle", "automobile", "automotive", or similar expressions. It is to be understood that these terms are not intended to limit the invention to any particular type of transportation vehicle. Rather, the invention may be applied to any type of transportation vehicle whether traveling by air, water, or ground, such as airplanes, boats, etc.

The foregoing detailed description is given primarily for clearness of understanding and no unnecessary limitations are to be understood therefrom for modifications can be made by those skilled in the art upon reading this disclosure and may be made without departing from the spirit of the invention.

What is claimed is:

1. A head up display arrangement for a motor vehicle, the arrangement comprising:
    an image source configured to emit a light field; and
    a freeform mirror positioned to provide a reflection of the light field, the reflection being reflected off of a windshield of the vehicle so as to be visible to a driver of the vehicle as a virtual image, the freeform mirror including a reflective surface having a shape such that the virtual image appears to be curved to the driver of the vehicle.

2. The head up display arrangement of claim 1 wherein the virtual image appears to have a concave shape.

3. The head up display arrangement of claim 1 wherein the virtual image appears to have a concave, cylindrical shape.

4. The head up display arrangement of claim 3 wherein an imaginary vertical line through the virtual image and two opposite lateral edges of the virtual image all appear to be approximately equidistant from the driver.

5. The head up display arrangement of claim 1 wherein the virtual image appears to be disposed outside the windshield and visible through the windshield.

6. The head up display arrangement of claim 5 wherein the virtual image is approximately between six and eight meters from the driver.

7. The head up display arrangement of claim 1 wherein the freeform mirror is aspheric.

8. A head up display method for a motor vehicle, the method comprising:
    emitting a light field; and
    providing a freeform mirror positioned to produce a reflection of the light field, the reflection then being reflected off of a windshield of the vehicle so as to be visible to a driver of the vehicle as a virtual image, a reflective surface of the freeform mirror producing the reflection, the reflective surface having a shape such that the virtual image appears to be curved to the driver of the vehicle.

9. The method of claim 8 wherein the virtual image appears to have a concave shape.

10. The method of claim 8 wherein the virtual image appears to have a concave, cylindrical shape.

11. The method of claim 10 wherein an imaginary vertical line through the virtual image and two opposite lateral edges of the virtual image all appear to be approximately equidistant from the driver.

12. The method of claim 8 wherein the virtual image appears to be disposed outside the windshield and visible through the windshield.

13. The method of claim 12 wherein the virtual image is approximately between six and eight meters from the driver.

14. The method of claim 8 wherein the freeform mirror is aspheric.

15. A head up display arrangement for a motor vehicle, the arrangement comprising:
- an image source configured to emit a light field;
- a freeform mirror having a reflective surface positioned to provide a reflection of the light field; and
- a windshield positioned to receive the reflection and provide a second reflection of the light field, the second reflection being visible to a driver of the vehicle as a virtual image disposed outside of the windshield, the reflective surface of the freeform mirror having a shape such that the virtual image appears to be curved to the driver of the vehicle.

16. The head up display arrangement of claim 15 wherein the virtual image appears to have a concave shape.

17. The head up display arrangement of claim 15 wherein the virtual image appears to have a concave, cylindrical shape.

18. The head up display arrangement of claim 17 wherein an imaginary vertical line through the virtual image and two opposite lateral edges of the virtual image all appear to be approximately equidistant from the driver.

19. The head up display arrangement of claim 15 wherein the virtual image appears to be disposed outside the windshield, visible through the windshield, and approximately between six and eight meters from the driver.

20. The head up display arrangement of claim 15 wherein the freeform mirror is aspheric.

* * * * *